(12) United States Patent
Lavin (10) Patent No.: US 11,408,511 B2
(45) Date of Patent: Aug. 9, 2022

(54) CIRCUMFERENTIAL SEAL ASSEMBLY

(71) Applicant: Eaton Intelligent Power Limited, Dublin (IE)

(72) Inventor: Jeffrey Lavin, Mattapoisett, MA (US)

(73) Assignee: Eaton Intelligent Power Limited, Dublin (IE)

( * ) Notice: Subject to any disclaimer, the term of this patent is extended or adjusted under 35 U.S.C. 154(b) by 77 days.

(21) Appl. No.: 17/100,635

(22) Filed: Nov. 20, 2020

(65) Prior Publication Data

US 2021/0156477 A1    May 27, 2021

Related U.S. Application Data

(60) Provisional application No. 62/941,620, filed on Nov. 27, 2019.

(51) Int. Cl.
*F16J 15/34* (2006.01)

(52) U.S. Cl.
CPC .............................. *F16J 15/3452* (2013.01)

(58) Field of Classification Search
CPC ........ F16J 15/3452; F16J 15/44; F16J 15/441; F16J 15/442; F16J 15/443
See application file for complete search history.

(56) References Cited

U.S. PATENT DOCUMENTS

| | | | |
|---|---|---|---|
| 7,175,388 B2* | 2/2007 | Labbe | F01D 11/02 415/230 |
| 7,914,007 B2 | 3/2011 | Berard et al. | |
| 8,490,982 B2* | 7/2013 | Roche | F01D 11/02 277/411 |
| 2013/0241153 A1* | 9/2013 | Garrison | F02C 7/28 277/350 |

* cited by examiner

*Primary Examiner* — Gilbert Y Lee
(74) *Attorney, Agent, or Firm* — Merchant & Gould P.C.

(57) ABSTRACT

An improved mechanical radial seal. The seal includes a rotor that when in motion pressurizes air and directs it to the interface between the rotor and the stator to impart lift on the stator. The fluid pressure generated by the rotation of the rotor biases the stator away from the rotor, which improves the overall performance of the seal.

20 Claims, 6 Drawing Sheets

CIRCUMFERENTIAL SEAL ASSEMBLY

CROSS-REFERENCE TO RELATED APPLICATIONS

This application claims priority to U.S. Provisional Application No. 62/941,620 filed on Nov. 27, 2019, the entire disclosure of which is hereby expressly incorporated herein by reference.

TECHNICAL FIELD

Mechanical seal assemblies and related methods of manufacturing mechanical seals.

BACKGROUND

A mechanical seal allows for relative movement between two structures while maintaining fluid separation at the interface between the moving structures. For example, a shaft may extend from and rotate relative to a stationary housing/seal. It may be desirable to contain pressurized oil or air in the housing. A mechanical seal can be positioned at the interface between the shaft and the housing to allow for the relative rotation and contain the oil in the housing. There are numerous applications for mechanical seals including, but not limited to, auxiliary power units, compressors, power generating gas turbines, aircraft engines, engine starters, fuel controls, gearboxes, engine accessories, nuclear valves, production machinery equipment, off-road vehicles, and turbochargers.

Mechanical seals come in a variety of configurations. One type of common mechanical seal is a radial seal. Radial seals are commonly used to enable a shaft to rotate relative to a housing from which it extends. There exist many different radial seal configurations. To increase the working life of the seal and decrease heat generation, some radial seals generate hydrodynamic film between moving components. Radial seal assemblies that utilize hydrodynamic film to prolong the life of the seal and to decrease heat generation are disclosed in U.S. Pat. No. 7,914,007, which is incorporated herein in its entirety. U.S. Pat. No. 7,914,007 discloses a system that generates hydrodynamic film via a wear component (the carbon graphite stator). As such, the hydrodynamic film generation changes as the component wears which is not ideal. In addition, the wear component has a more complex geometry than would otherwise be desired. Additional advancement in seal technology that extends the life and overall performance of radial seals is desirable.

SUMMARY

The present disclosure provides an improved mechanical radial seal. The seal includes a runner also commonly referred to as a rotor. The rotor is configured to generate hydrodynamic film between itself and the stator. In the depicted embodiment, the rotor when in motion pressurizes fluid (air) and directs the pressurized fluid to the interface between the rotor and the stator to impart lift on the stator. The fluid pressure generated by the rotation of the rotor biases the stator away from the rotor, which improves the overall performance of the seal. The stator in the depicted embodiment is a segmental carbon-sealing component.

The summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following Detailed Description. Embodiments of the present disclosure will hereinafter be described in conjunction with the appended drawings, wherein like numerals denote like elements.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
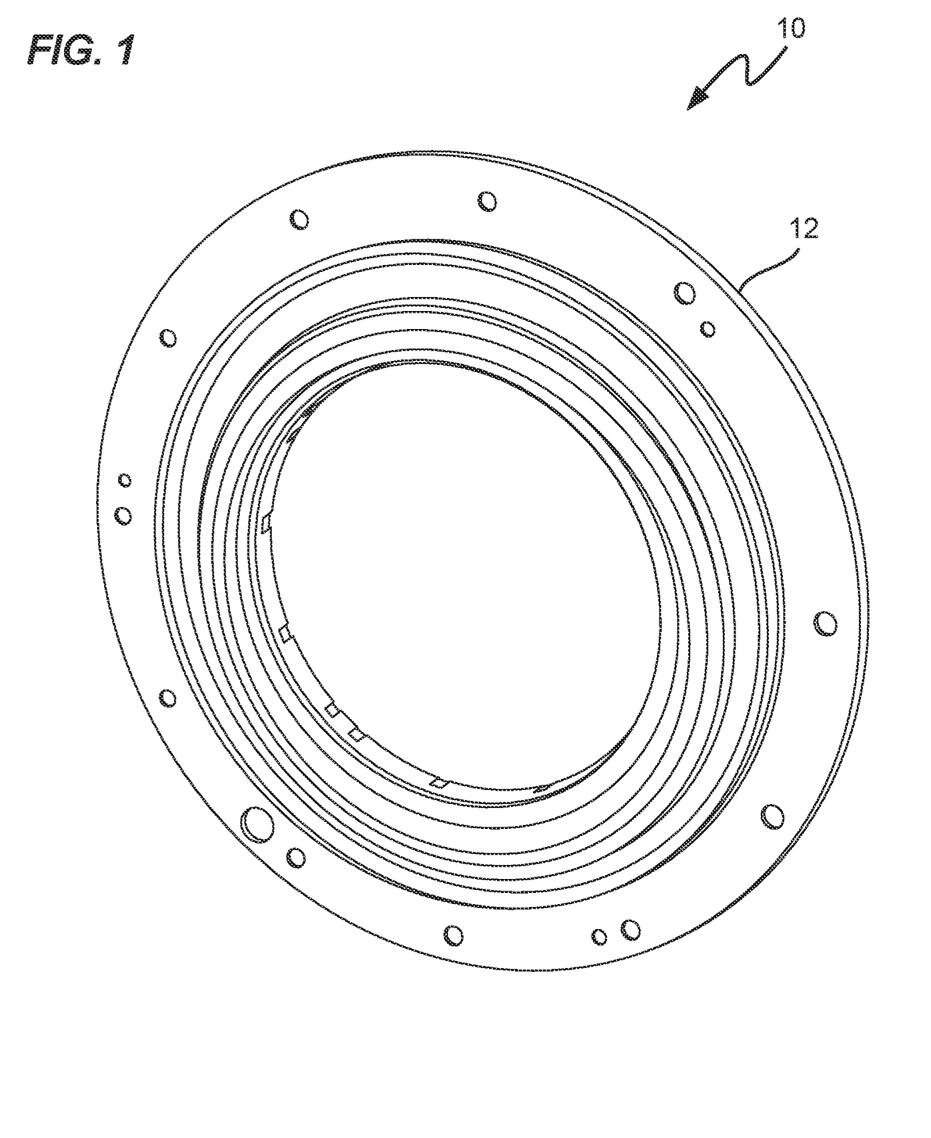
FIG. 1 is an isometric view of an embodiment of the circumferential segmented seal assembly.
Figure 2:
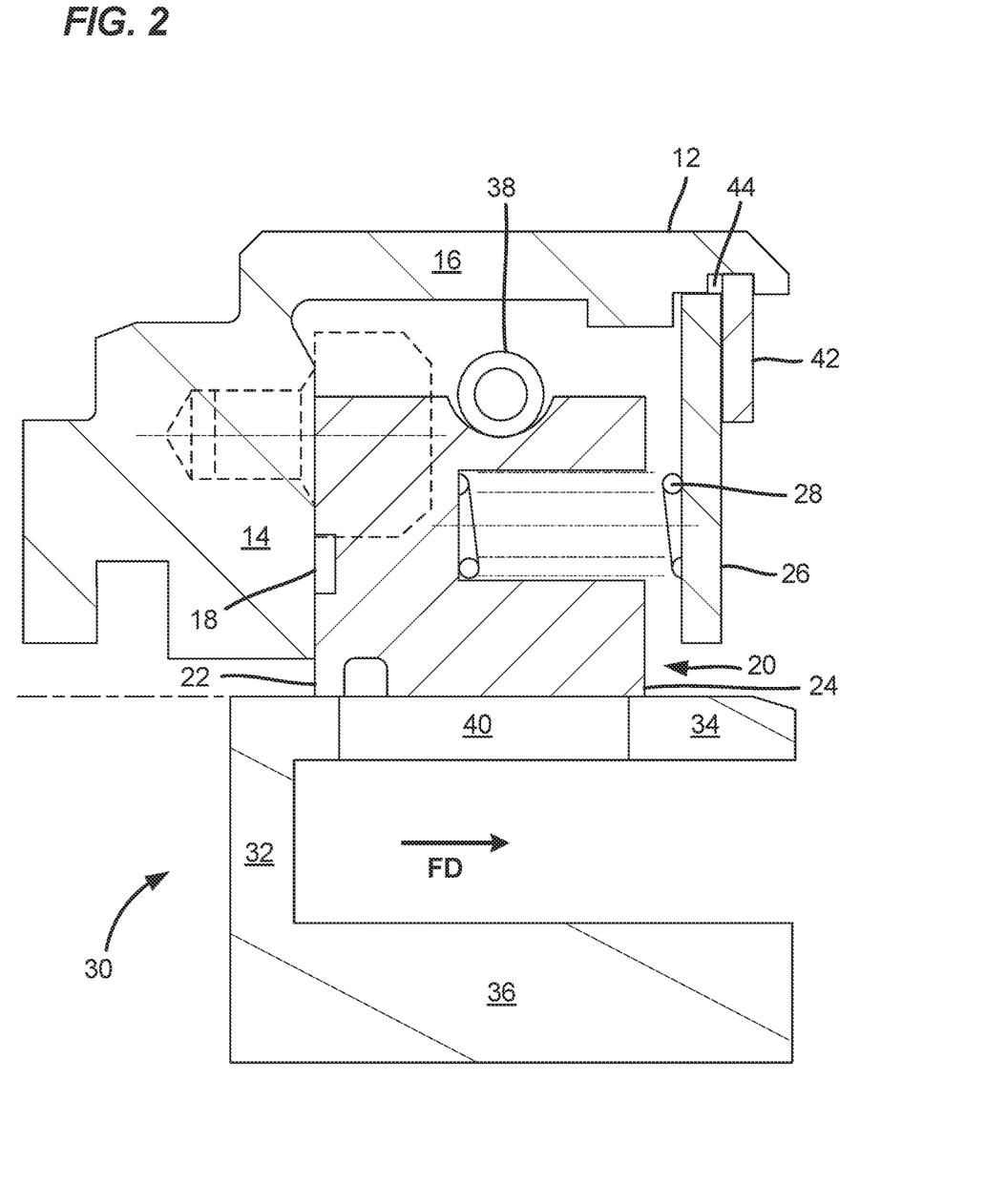
FIG. 2 is a partial cross-sectional view of the seal assembly of FIG. 1.

Referring generally to the figures, embodiments of the circumferential segmented seal assembly of the present disclosure will be described in further detail. In the depicted embodiment, the circumferential segmented seal assembly 10 includes a seal housing 12 that includes a radially extending end wall portion 14 and an axially extending cylindrical wall portion 16. In the depicted embodiment, the radially extending end wall portion 14 includes a machined inner surface portion 18. See FIG. 2. It should be appreciated that many alternative seal housing configurations are possible.

In the depicted embodiment, the circumferential segmented seal assembly 10 includes a stator sealing element 20. In the depicted embodiment, the stator sealing element 20 is a segmented carbon ring. The stator sealing element 20 includes a first end 22 and a second end 24. The stator sealing element 20 is positioned such that the first end 22 abuts the machined inner surface portion 18 of the radially extending end wall portion 14 of the seal housing 12.

In the depicted embodiment, the circumferential segmented seal assembly 10 includes an annular end ring 26. In the depicted embodiment, the stator sealing element 20 is positioned between the first end wall portion 14 of the seal housing 12 and the annular end ring 26. In the depicted embodiment, a spring 28 is positioned between the stator sealing element 20 and the annular end ring 26. The spring 28 is arranged and configured to bias the first end 22 of the stator sealing element 20 against the machined inner surface portion 18 of the seal housing 12. In the depicted embodiment, the spring 28 is a metal spring (e.g., coil spring). The spring 28 in the depicted embodiment is partially received within recess in the stator sealing element. In the depicted embodiment, the circumferential segmented seal assembly 10 includes a ring retainer 42 that is seated in groove 44 in an inside surface of the axially extending cylindrical wall portion 16 of the seal housing 12. In the depicted embodiment, the ring retainer 42 is positioned adjacent the annular end ring 26 and retains the annular end ring 26 in the seal housing 12. It should be appreciated that many alternative configurations are possible.

Figure 3:
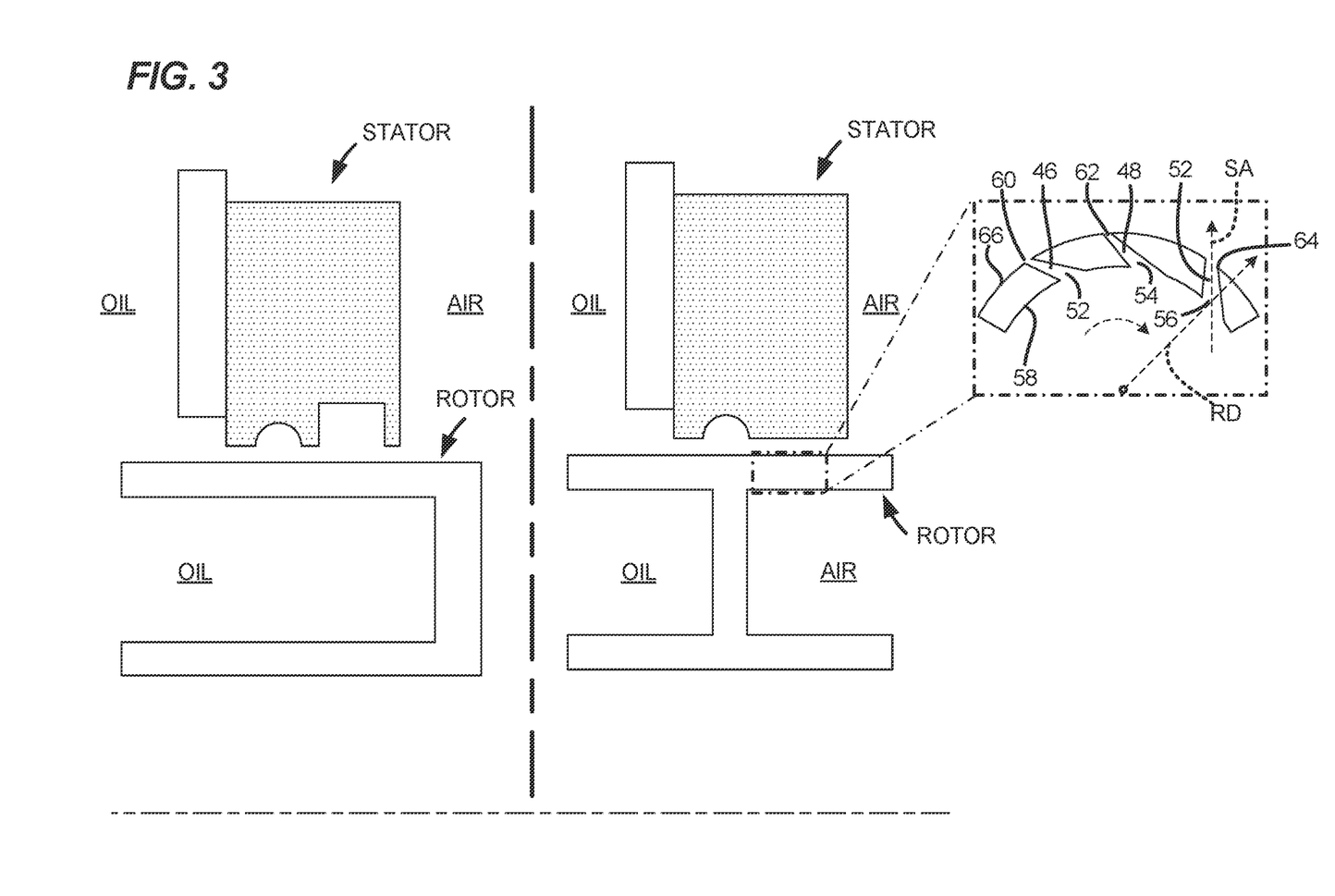
FIG. 3 is a schematic view of alternative embodiments of the circumferential segmented seal assembly.
Figure 4A:
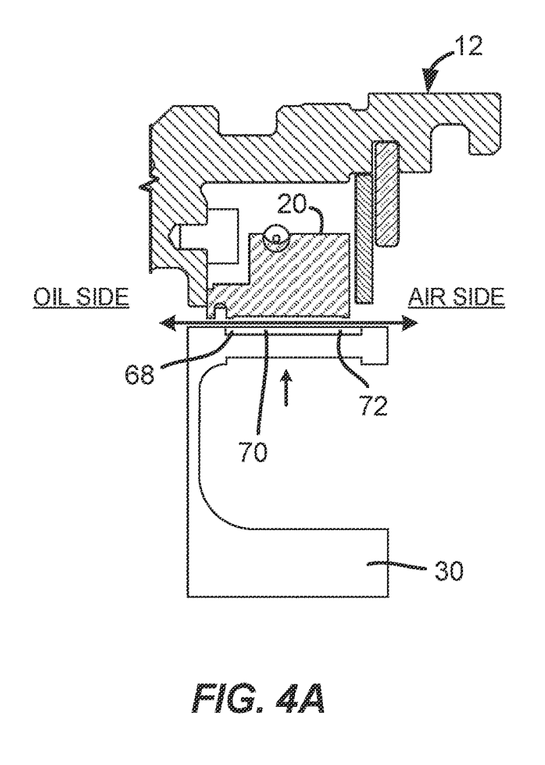
FIGS. 4A-4C are partial cross-sectional views of the circumferential segmented seal assembly of FIG. 1 with the rotor in different positions relative to the stator.
Figure 4B:
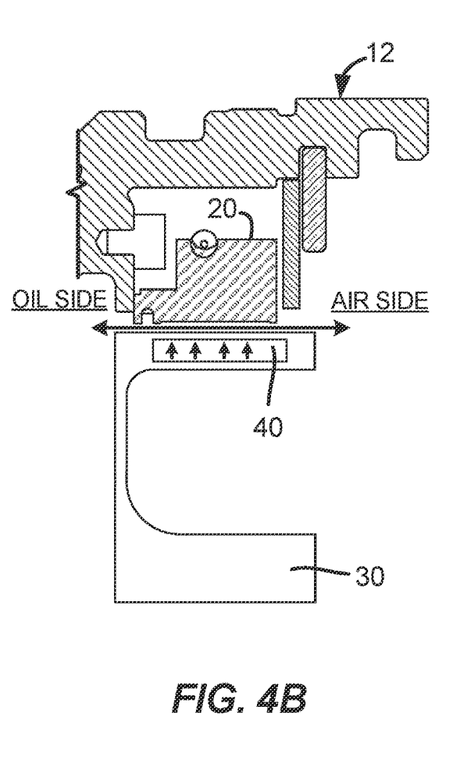
Figure 4C:
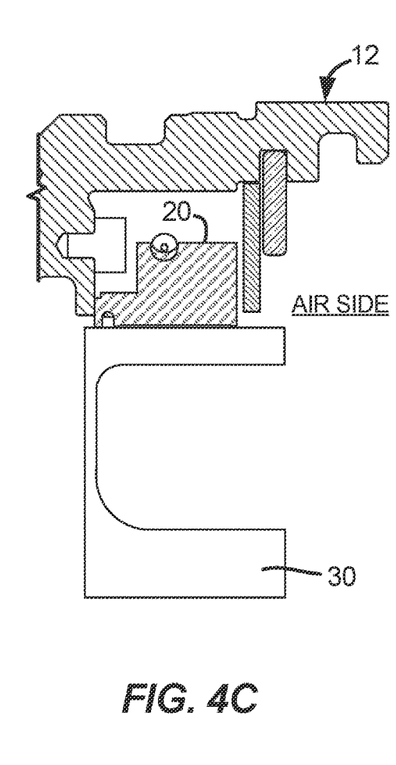
Figure 5:
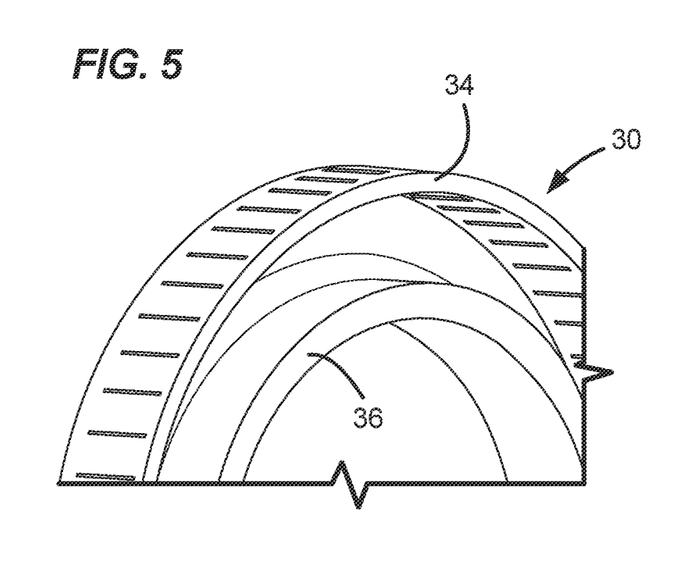
FIG. 5 is an isometric view of the rotor of the circumferential segmented seal assembly of FIG. 1.
Figure 6:
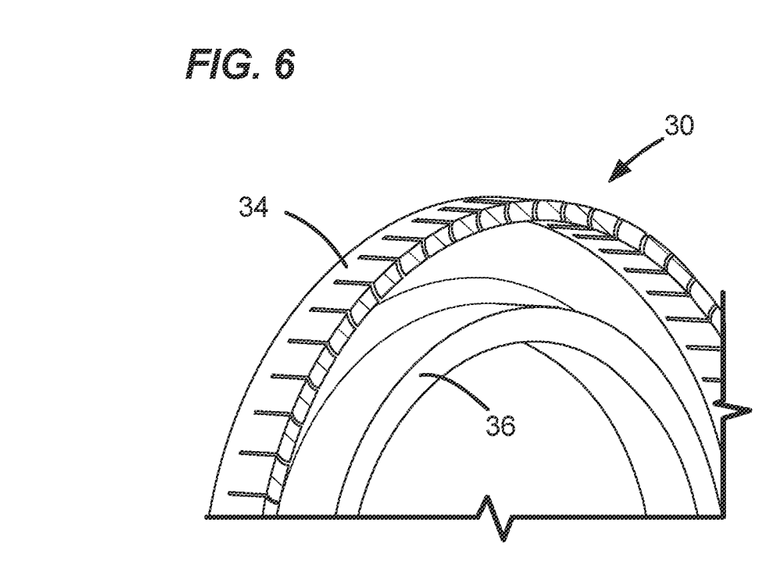
FIG. 6 is a partial radial cross-section of the rotor of FIG. 5.
Figure 7:
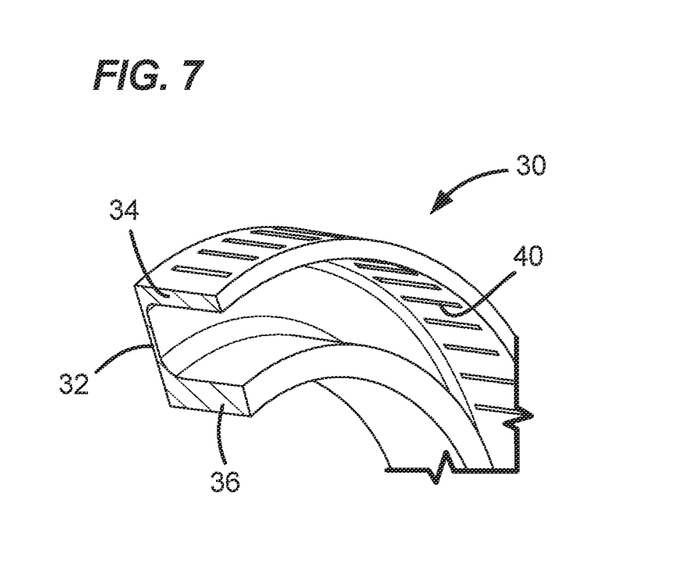
FIG. 7 is a partial axial cross-section of the rotor of FIG. 5.
Figure 8:
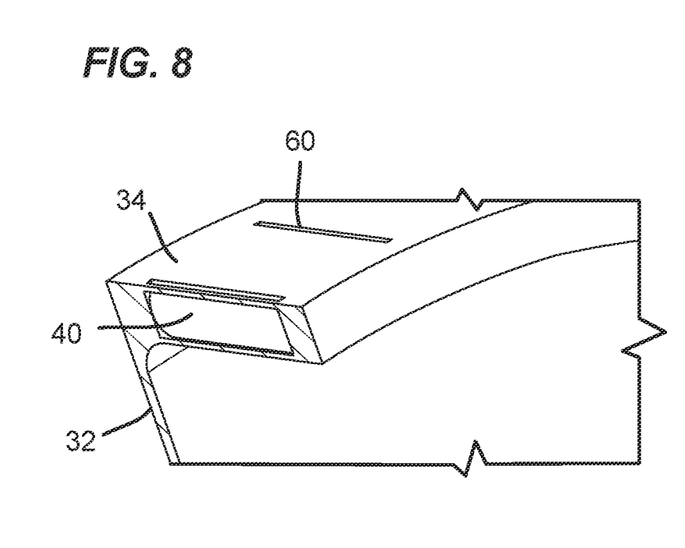
FIG. 8 is a partial axial cross-section of the rotor of FIG. 5.

In the depicted embodiment, the circumferential segmented seal assembly 10 includes an annular rotor 30 arranged concentric with the stator sealing element 20. The annular rotor 30 includes a first end portion 32 and an outer cylindrical wall portion 34 extending axially in a first direction FD from the first end portion 32 and an opposed inner cylindrical wall portion 36 extending radially in the first direction FD from the first end portion 32. In the depicted embodiment, the annular rotor 30 has a C-shaped cross-section. In an alternative embodiment, the annular rotor 30 can have other cross-sectional shapes. For example, FIG. 3 depicts an annular rotor 30 having an H-shaped cross-section. In the depicted embodiment, the annular rotor 30 has a metal construction. It should be appreciated that many alternative configurations are possible.

In the depicted embodiment, the circumferential segmented seal assembly 10 includes a circumferential spring 38 positioned radially around the stator sealing element 20 configured to apply a radial load on the stator sealing element 20 to bias the stator sealing element 20 against the outer cylindrical wall portion 34 of the annular rotor 30. It should be appreciated that many alternative configurations are possible.

In the depicted embodiment, the outer cylindrical wall portion 34 of the annular rotor 30 includes a plurality of through apertures 40 configured to generate an increase in air pressure at the interface between the stator sealing element 20 and the annular rotor 30 when the annular rotor 30 rotates. In the depicted embodiment, the through apertures 40 in the outer cylindrical wall portion 34 of the annular rotor 30 include a plurality of slots. Although in the depicted embodiment all through apertures 40 are slot shaped, it should be appreciated that in alternative embodiments, the through apertures 40 may not be slots. For example, the through apertures 40 could be round through holes or any other type of aperture. In addition, an impeller could be incorporated to generate additional flow to improve performance.

In the depicted embodiment, referring to FIG. 3 the at least some of the slots have a slot angle SA that is angled relative to the radial direction RD. In the depicted embodiment, some of the slots 46, 48, 52 have asymmetric cross-sections in a radial plane. In the depicted embodiment, at least some of the slots 46, 48, 52 have wedge shaped cross-sections in a radial plane. In the depicted embodiment, some of the slots 46, 48, 52 have an inner opening 52, 54, 56 on the inside surface 58 of the outer cylindrical wall portion 34, and an outer opening 60, 62, 64 on the outside surface 66 of the cylindrical wall portion 34. In the depicted embodiment, the inner opening 52, 54, 56 is at least fifty percent larger than the outer opening 60, 62, 64. It should be appreciated that many alternative configurations are possible. For example, the slots need not be asymmetrical and they need not be wedge shaped.

In the depicted embodiment, the slots 46, 48, 50 are uniformly spaced on the outer cylindrical wall portion 34 of the annular rotor 30. In the depicted embodiments, the slots 46, 48, 50 are parallel to one another and axially aligned. It should be appreciated that many alternative configurations are possible.

In the depicted embodiment, the outer opening 60, 62, 64 of the slot 46, 48, 50 includes a first end portion 68, a middle portion 70, and a second end portion 72. In the depicted embodiment, the first end portion 68 and the middle portion 70 are radially aligned with the stator sealing element 20, and the second end portion 72 is off set from the stator sealing element 20 in the first direction FD. Alternatively, the first end portion 68, the middle portion 70, and the second end portion 72 can all be radially aligned with the stator sealing element 20. It should be appreciated that many alternative configurations are possible.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A radial seal assembly comprising:
a seal housing including a radially extending end wall portion and an axially extending cylindrical wall portion, the radially extending end wall portion including a machined inner surface portion;
a stator sealing element including a first end and a second end, the stator sealing element positioned such that the first end abuts the machined inner surface portion of the radially extending end wall portion of the seal housing;
an annular end ring, wherein the stator sealing element is positioned between the first end wall portion of the seal housing and the annular end ring;
a spring positioned between the stator sealing element and the annular end ring and configured to bias the first end of the stator sealing element against the machined inner surface portion of the seal housing;
an annular rotor arranged concentric with the stator sealing element, wherein the annular rotor includes a first end portion and an outer cylindrical wall portion extending axially in a first direction from the first end portion and an opposed inner cylindrical wall portion extending radially in the first direction from the first end portion;
a circumferential member positioned radially around the stator sealing element configured to apply a radial load on the stator sealing element to bias the stator sealing element against the outer cylindrical wall portion of the annular rotor;
wherein the outer cylindrical wall portion of the annular rotor includes a plurality of through apertures configured to generate an increase in air pressure at the interface between the stator sealing element and the annular rotor when the annular rotor rotates.

2. The radial seal assembly of claim 1, wherein the stator sealing element is a segmented carbon ring.

3. The radial seal assembly of claim 2, wherein the annular rotor has a metal construction.

4. The radial seal assembly of claim 1, wherein the through apertures in the outer cylindrical wall portion of the annular rotor include a plurality of slots.

5. The radial seal assembly of claim 4, wherein at least some of the slots are angled relative to the radial direction.

6. The radial seal assembly of claim 5, wherein at least some of the slots have asymmetric cross-sections in a radial plane.

7. The radial seal assembly of claim 5, wherein at least some of the slots have an inner opening on the inside surface of the outer cylindrical wall portion and an outer opening on the outside surface of the cylindrical wall portion, wherein the inner opening is equal to or greater than fifty percent larger than the outer opening.

8. The radial seal assembly of claim 5, wherein at least some of the slots have wedge shaped cross-sections in a radial plane.

9. The radial seal assembly of claim 5, wherein the slots are uniformly spaced on the outer cylindrical wall portion of the annular rotor.

10. The radial seal assembly of claim 5, wherein the slots are parallel to one another and axially aligned.

11. The radial seal assembly of claim 1, wherein the annular rotor has an H-shaped cross-section.

12. The radial seal assembly of claim 1, wherein the annular rotor has a C-shaped cross-section.

13. The radial seal assembly of claim 1, wherein at least some of the slots have an inner opening on the inside surface of the outer cylindrical wall portion and an outer opening on the outside surface of the cylindrical wall portion, wherein the outer opening of the slot includes a first end portion, a middle portion, and a second end portion, wherein the first end portion and the middle portion are radially aligned with the stator sealing element, and the second end portion is off set from the stator sealing element in the first direction.

14. The radial seal assembly of claim 1, wherein at least some of the slots have an inner opening on the inside surface of the outer cylindrical wall portion and an outer opening on the outside surface of the cylindrical wall portion, wherein the outer opening of the slot includes a first end portion, a middle portion, and a second end portion, wherein the first end portion, the middle portion, and the second end portion are radially aligned with the stator sealing element.

15. The radial seal assembly of claim 1, wherein the spring positioned between the stator sealing element is a metal coil spring.

16. The radial seal assembly of claim 1, further comprising a ring retainer that is seated in a groove in an inside surface of the axially extending cylindrical wall portion of the seal housing, the ring retainer positioned adjacent to the annular end ring.

17. The radial seal assembly of claim 1, wherein the through apertures in the outer cylindrical wall portion of the annular rotor include a plurality of round through holes.

18. A radial seal assembly comprising:
a seal housing including a radially extending end wall portion and an axially extending cylindrical wall portion, the radially extending end wall portion including a machined inner surface portion;
a segmented carbon ring including a first end and a second end, the segmented carbon ring positioned such that the first end abuts the machined inner surface portion of the radially extending end wall portion of the seal housing;
an annular end ring, wherein the segmented carbon ring is positioned between the first end wall portion of the seal housing and the annular end ring;
an annular metal rotor arranged concentric with the segmented carbon ring, wherein the annular rotor includes a first end portion and an outer cylindrical wall portion extending axially in a first direction from the first end portion and an opposed inner cylindrical wall portion extending radially in the first direction from the first end portion;
a metal coil spring positioned between the segmented carbon ring and the annular end ring and configured to bias the first end of the segmented carbon ring against the machined inner surface portion of the seal housing;
a circumferential member positioned radially around the segmented carbon ring configured to apply a radial load on the segmented carbon ring to bias the segmented carbon ring against the outer cylindrical wall portion of the annular rotor;
wherein the outer cylindrical wall portion of the annular rotor includes a plurality of through slots configured to generate an increase in air pressure at the interface between the segmented carbon ring and the annular rotor when the annular rotor rotates;
wherein the slots are angled relative to the radial direction;
wherein the slots have asymmetric wedge shaped cross-sections in a radial plane;
wherein the slots have an inner opening on the inside surface of the outer cylindrical wall portion and an outer opening on the outside surface of the cylindrical wall portion, the inner opening is equal to or greater than fifty percent larger than the outer opening;

wherein the outer opening of the slots are uniformly spaced on the outer cylindrical wall portion of the annular rotor;

wherein at least some of the outer openings of the slots include a first end portion, a middle portion, and a second end portion, wherein at least the first end portion and the middle portion are radially aligned with the segmented carbon ring;

wherein the outer opening of at least some of the slots are parallel to one another and axially aligned.

19. The radial seal assembly of claim 18, wherein the second end portion of at least some of the slots are off set from the segmented carbon ring in the first direction.

20. The radial seal assembly of claim 18, wherein the circumferential member is a spring.

* * * * *